Nov. 3, 1936.  C. STEENSTRUP  2,059,822
METHOD OF MAKING FABRICATED PISTON AND CROSSHEAD ASSEMBLIES
Filed March 22, 1935
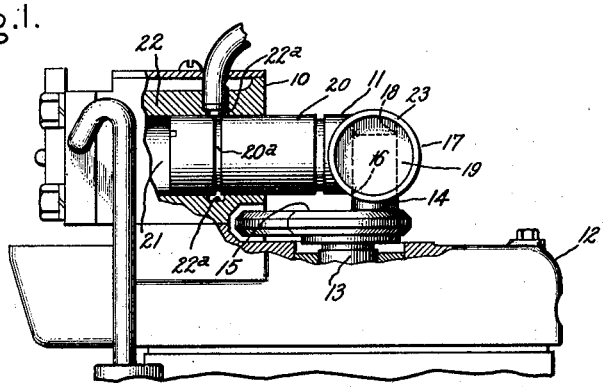
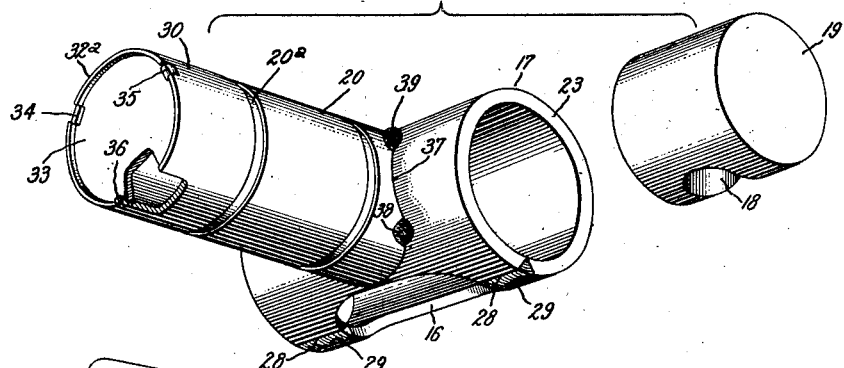
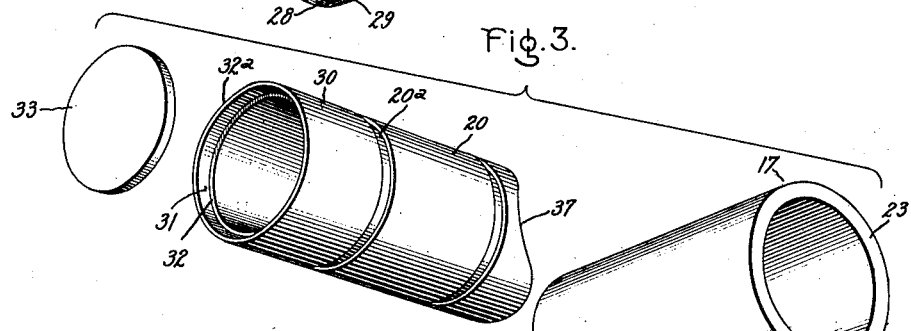
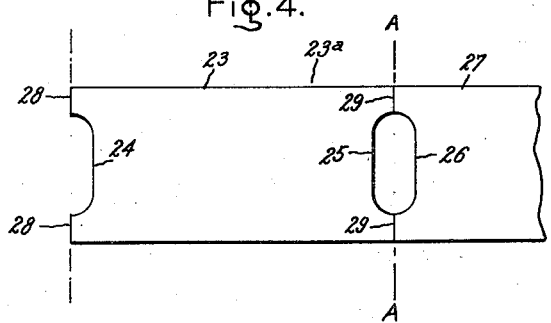
Inventor:
Christian Steenstrup,
by Harry E. Dunham
His Attorney.

Patented Nov. 3, 1936

2,059,822

UNITED STATES PATENT OFFICE 2,059,822

METHOD OF MAKING FABRICATED PISTON AND CROSSHEAD ASSEMBLIES

Christian Steenstrup, Schenectady, N. Y., assignor to General Electric Company, a corporation of New York Application March 22, 1935, Serial No. 12,390

4 Claims. (Cl. 29—156.5)

My invention relates to methods of making fabricated piston and crosshead assemblies for Scotch yoke type compressors, or the like.

It is an object of my invention to provide an improved method of fabricating a crosshead and piston assembly of the Scotch yoke type.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which Fig. 1 is a side elevation, partly in section, of a Scotch yoke type refrigerant compressor including a fabricated piston and crosshead assembly embodying my invention; Fig. 2 is an exploded perspective view of the piston and crosshead assembly and slide therefor, of the compressor shown in Fig. 1; Fig. 3 is an exploded perspective view of the parts of the piston and cross head assembly shown in Figs. 1 and 2; and Fig. 4 is a developed view of the sheet material used to form the crosshead shown in Figs. 1 to 3.

Referring to the drawing, I have shown in Fig. 1 a compressor 10 provided with a fabricated piston and crosshead assembly 11 embodying my invention. The compressor 10 is driven by an electric motor 12 having a vertical rotor shaft 13. The shaft 13 rotates a crank arm 14, which is mounted eccentrically thereto on a counterweight 15. The crank arm 14 passes through a longitudinal slot 16 formed in the lower side of a fabricated cylindrical crosshead 17 and into a hole 18 formed in the lower side of a cylindrical slide 19. The slide 19 is machined to have a sliding fit in the crosshead 17. The rotation of the crank arm 14 causes the slide 19 to reciprocate in the crosshead 17, and also causes a piston 20, rigidly secured to the crosshead 17, to reciprocate in a bore 21 of a compressor cylinder 22. The rotary motion of the crank arm 14 is thus converted into reciprocatory motion of the piston 20, the slide 19 reciprocating in the crosshead at right angles to the axis of the piston.

The piston 20 is provided with an annular oil groove 20a, which in the position of the piston 20 illustrated in Fig. 1, registers with a complementary annular groove 22a formed in the wall of the cylinder 22. Oil or other liquid lubricant is circulated through the groove 22a, a portion of it being trapped in the groove 20a. The lubricant is thus carried along the cylinder wall and serves to lubricate the same as well as to seal the piston against leakage of compressed gaseous refrigerant.

The crosshead 17 is made by a method which includes forming the same from a rectangular sheet of metal 23 severed from a strip 23a of steel, or the like. The rectangular sheet of metal 23 is severed from the strip 23a, as indicated at line A—A in Fig. 4. Sheets of metal, similar to the sheet 23, may be successively severed from the strip 23a. It will be noted that notches 24 and 25 are formed in the opposite ends of the sheet 23. I have found it advantageous to punch the adjacent notches in the successive sheets of metal cut from the strip 23a at the same time that the sheets are severed therefrom; that is, the notch 25 in sheet 23 is punched therein at the same time that a notch 26 in sheet 27 is punched and also at the same time that the sheet 23 is severed from the strip 23a. This operation is preferably performed by a single punching die.

The sheet 23 is then bent into a cylindrical form on a suitable mandrel, or in any other manner well known to those skilled in the art, the transverse notched edges 28 and 29 being placed in juxtaposition. Since the outer periphery of the cylinder is greater than the inner periphery, a V-shaped groove may be formed between the juxtaposed edges 28 and 29 when the sheet 23 is bent in the form of a cylinder with the inner margins of the edges 28 and 29 in contact. The edges 28 and 29 are then joined together in a longitudinal fused metal seam, preferably by butt welding them together by an arc weld deposit formed in the groove between the same as indicated in Figs. 2 and 3. The notches formed in the ends of the sheets are preferably made with quarter rounded ends in order that the slot 16 in the finished crosshead will have rounded ends conforming to the slide of the cylindrical crank 14. The slot 16 in the crosshead 17 may be formed by a single slot or transverse opening punched in the sheet 23 or by a single notch formed in one transverse edge thereof. I prefer to form the slot 16 by complementary notches, such as the notches 24 and 25, in the opposite transverse edges of the sheet 23, however, since the length of the welded seam between the abutting edges 28 and 29 is thus minimized. The minimizing of the length of the welded seam not only effects a saving in material, but also a saving in the time and labor required in manufacture.

The piston 20 includes a cylindrical body portion 30 which is preferably formed of seamless steel tubing. An annular counterbore 31 is machined, or otherwise formed, in one end of the piston body 30. The counterbore 31 thus forms a shoulder 32 within the piston 30 surrounded by a reduced side wall 32a. A flat disk-shaped piston head 33 is seated on the shoulder 32 within the wall 32a and is held firmly positioned therein by a series of spaced lugs 34, 35 and 36. These lugs are spaced approximately 120° apart and are formed by notching portions of the reduced wall 32a of the piston body 30 and then peening the same over on to the piston head 33. The piston head 33 is brazed to the piston body 30 in order to hold it firmly in position thereon and also in order to provide an hermetic seal about the edges of the piston head 33, thus preventing the leakage of compressed gaseous refrigerant into the interior of the piston body 30. This brazing operation is preferably done at the same time that the piston body 30 is brazed to the crosshead 17, as described below.

The end of the piston body 30 opposite the piston head 33 is provided with an inwardly extending recess 37 having arcuate edges, so that when the piston 20 is arranged in its assembled position on the crosshead 17 at right angles thereto, the end of the piston 20 will conform closely to the side wall of the cylindrical crosshead 17. The piston 20 is secured to the crosshead 17 by fused metal. This is preferably done by first spot welding the piston 20 to the crosshead 17 by a series of spaced arc welding deposits, such as 38 and 39. The piston 20 is then brazed to the crosshead 17 in a seam extending about the base of the piston thus rigidly securing them together. The piston head 33 is preferably brazed to the piston body 20 at the same time in order that both operations may be carried out in a brazing furnace at the same time. After the piston and crosshead assembly has been thus assembled in the position shown in Fig. 2 with the piston 20 displaced approximately 90° from the center of the slot 16, the surface of the piston body 30 and the base in the crosshead 17 are machined or ground. The slide 19 then may be inserted in the crosshead 17 and the entire piston and crosshead assembly is then ready for insertion in the compressor 10.

It will thus be seen that I have provided a fabricated piston and crosshead assembly in which standard forms of metal, such as are commonly available, may be used throughout. As noted above, the piston 20 may be made from ordinary seamless steel tubing. The piston head 33 may be stamped from ordinary sheet steel, and the sheet 23 may be punched from a strip of steel, as described above. It is particularly advantageous to form the slot 16 in the crosshead 17 by punching, or otherwise forming, the same in the sheet 23 when it is flat, since the cost of the operation is thus much reduced, as compared to the cost of milling or otherwise forming such a slot in the side of a preformed cylinder or tube.

While I have shown a particular embodiment of my invention, in connection with a refrigerating machine compressor, I do not desire my invention to be limited to the particular construction or method shown and described, and I intend in the appended claims to cover all modifications within the spirit and scope of my invention.

What I claim as new and desire to secure by Letters Patent of the United States is:

1. A method of making a fabricated piston and crosshead assembly for a Scotch yoke type compressor, or the like, which comprises forming complementary notches in the transverse edges of a flat rectangular sheet of metal, bending said sheet to form a cylindrical crosshead with said transverse edges of said sheet and said complementary notches in juxtaposition to provide an axially extending slot in said cylindrical crosshead, securing said juxtaposed edges together by fusion of metal to form a longitudinal seam at the opposite ends of the slot formed by said complementary notches, and securing a cylindrical piston body by fusion of metal to said cross-head, said piston being displaced about the periphery of said crosshead approximately 90° from the center of said slot and arranged at right angles with respect to said crosshead.

2. A method of making a fabricated piston and crosshead assembly for a Scotch yoke type compressor, or the like, which comprises forming complementary notches in the transverse edges of a flat rectangular sheet of metal, bending said sheet to form a cylindrical crosshead with said transverse edges of said sheet in abutting relation to provide an axially extending slot in said cylindrical crosshead, butt welding said abutting edges together to form a longitudinal seam at the opposite ends of said slot formed by said complementary notches, positioning a cylindrical piston body on said cylindrical crosshead by a series of spaced spot welds, and securing said piston body rigidly to said cylinder by fusion of metal, said piston being displaced about the periphery of said crosshead approximately 90° from the center of said slot and arranged at right angles with respect to said crosshead.

3. A method of making a fabricated piston and crosshead assembly for a Scotch yoke type compressor, or the like, which comprises forming a transverse opening in a rectangular flat sheet of metal, bending said sheet into the form of a cylindrical crosshead with the transverse edges of said sheet in juxtaposition, said opening providing an axially extending slot in said cylindrical crosshead, securing said juxtaposed edges together by fusion of metal to form a longitudinal seam in said cylindrical crosshead, positioning a cylindrical piston body on said cylindrical crosshead by a series of spot welds and securing said cylindrical piston body to said cylindrical crosshead by fusion of metal, said piston being displaced about the periphery of said crosshead approximately 90° from the center of said slot and arranged at right angles with respect to said crosshead.

4. A method of making a fabricated piston and crosshead assembly for a Scotch yoke type compressor, or the like, which comprises forming a notch in at least one transverse edge of a flat rectangular sheet of metal, bending said sheet into the form of a cylindrical crosshead with the transverse edges of said sheet in juxtaposition to provide an axially extending slot formed by said notch in said cylindrical crosshead, securing said juxtaposed edges together by fusion of metal to form a longitudinal seam at the opposite ends of said slot formed by said notch, and securing a cylindrical piston body to said cylindrical crosshead thereto by fusion of metal, said piston being displaced about the periphery of said crosshead approximately 90° from the center of said slot and arranged at right angles with respect to said crosshead.

CHRISTIAN STEENSTRUP.